United States Patent
Hemmsen et al.

(10) Patent No.: US 9,704,474 B2
(45) Date of Patent: Jul. 11, 2017

(54) ULTRASOUND IMAGING PROBE WITH SIGMA-DELTA BEAMFORMER AND APODIZATION THEREIN

(71) Applicant: B-K MEDICAL APS, Herlev (DK)

(72) Inventors: Martin C. Hemmsen, Virum (DK); Borislav G. Tomov, Smorum (DK); Matthias B. Stuart, Birkerod (DK); Jorgen Arendt Jensen, Horsholm (DK)

(73) Assignee: B-K Medical Aps, Herlev (DK)

(*) Notice: Subject to any disclaimer, the term of this patent is extended or adjusted under 35 U.S.C. 154(b) by 118 days.

(21) Appl. No.: 14/647,274

(22) PCT Filed: Nov. 28, 2012

(86) PCT No.: PCT/IB2012/002521
§ 371 (c)(1),
(2) Date: May 26, 2015

(87) PCT Pub. No.: WO2014/083372
PCT Pub. Date: Jun. 5, 2014

(65) Prior Publication Data
US 2015/0340023 A1    Nov. 26, 2015

(51) Int. Cl.
*G10K 11/34* (2006.01)
*G01S 15/02* (2006.01)
*G01S 7/52* (2006.01)

(52) U.S. Cl.
CPC .......... *G10K 11/341* (2013.01); *G01S 7/5208* (2013.01); *G01S 7/52017* (2013.01); *G01S 7/52047* (2013.01); *G01S 15/02* (2013.01)

(58) Field of Classification Search
CPC .... G01S 7/52047; G01S 7/5208; G01S 15/02; G01S 7/52017; G10K 11/341
See application file for complete search history.

(56) References Cited

U.S. PATENT DOCUMENTS

| | | | |
|---|---|---|---|
| 5,203,335 A | 4/1993 | Noujaim et al. | |
| 5,905,692 A * | 5/1999 | Dolazza | G01S 7/52023 367/103 |
| 5,964,708 A | 10/1999 | Freeman et al. | |
| 6,208,189 B1 | 3/2001 | Freeman et al. | |
| 6,867,720 B1 | 3/2005 | Freeman et al. | |

(Continued)

FOREIGN PATENT DOCUMENTS

WO    2007089580 A2    9/2007

OTHER PUBLICATIONS

Orhan Norman, A Band-Pass Delta-Sigma Modulator for Ultrasound Imaging at 160 MHz Clock Rate, IEEE Journal of Solid-State Circuts, Dec. 1996, vol. 31, No. 12.

(Continued)

*Primary Examiner* — Daniel Pihulic
(74) *Attorney, Agent, or Firm* — Anthony M. Del Zoppo, III; Driggs, Hogg, Daugherty & Del Zoppo Co. LPA (57) ABSTRACT

An ultrasound transducer probe (104) includes a transducer array (108) of elements (110) that emit an ultrasound signal and receive analog echo signals produced in response thereto and a beamformer (112), housed by the probe, that converts the analog echo signals to digital signals, applies delays to the digital signals, and sums the delayed digital signals, produces a value of a bit stream, wherein the beamformer apodizes the signals.

20 Claims, 7 Drawing Sheets

(56) References Cited

U.S. PATENT DOCUMENTS

2007/0229336 A1    10/2007  Liu et al.
2009/0069686 A1     3/2009  Daft et al.
2015/0340023 A1*   11/2015  Hemmsen ........... G01S 7/52047
                                                    367/7

OTHER PUBLICATIONS

Borislav Gueorguiev Tomov and Jense, Compact FPGA-Based Beamformer Using Oversampled 1-bit A/D Converters, IEEE Transactions of Ultrasonics, Ferroelectrics and Frequency Control, May 2005, vol. 52, No. 5.
PCT/IB2012/002521 International Search Report published as WO2014/083372 on Jun. 5, 2014.
Inose, H., Yasuda, Y., and Murakami, J., A telemetering system by code modulation—Sigma-Delta modulation, Space Electronics and Telemetry Ire Transactions on SET-8(3), 204-209 (1962). Abstract Attached.

\* cited by examiner

ULTRASOUND IMAGING PROBE WITH SIGMA-DELTA BEAMFORMER AND APODIZATION THEREIN

RELATED APPLICATION

This application is a national filing of PCT application Serial No. PCT/IB2012/002521, filed Nov. 28, 2012, published as WO2014/083372 on Jun. 5, 2014. This application claims priority to PCT application Serial No. PCT/IB2012/002521, published as WO2014/083372 on Jun. 5, 2014.

TECHNICAL FIELD

The following generally relates to beamforming and more particularly to an ultrasound imaging probe with both Sigma-Delta beamforming and apodization, and is described with particular application to an ultrasound imaging system.

BACKGROUND

Ultrasound (US) imaging systems have provided useful information about the interior characteristics of a subject under examination. An US imaging system has included a console and a probe that houses a transducer array. The transducer array has been electrically connected to the console via one coaxial cable per element or group of elements of the transducer array. Unfortunately, such a configuration is not well-suited for high channel count systems (e.g., 3D), wireless transducers, and/or other systems in which larger amounts of data are conveyed from the transducer array to the console.

A beamformer with a Sigma-Delta ($\Delta\Sigma$) modulator can be used to reduce the amount of data transmitted between the transducer array and the console by digitizing the analog data from the individual channels, summing the digitized data into a single bit stream. Sigma-Delta modulation is discussed in Inose, et al., "A telemetering system by code modulation—$\Delta\Sigma$-modulation," Space Electronics and Telemetry IRE Transactions on SET-8(3), 204-209 (1962), and Sigma-Delta beamforming is discussed in U.S. Pat. No. 5,203,335 to Noujaim et al. and in U.S. Pat. No. 5,964,708 and U.S. Pat. No. 6,208,189 to Freeman et al.

Sigma-Delta beamformers have been targeted towards line-by-line beamforming, which requires dynamic focusing in receive (equivalent to variation of the delays between the contributing channels). U.S. Pat. No. 5,964,708 and U.S. Pat. No. 6,208,189 discloses a $\Delta\Sigma$ beamformer that utilizes a switchable feedback amplitude to compensate for errors introduced by dynamic focusing. This includes compensating for shortening the bit stream due to dropping samples out and stretching the bit stream due to adding samples. Unfortunately, these Sigma-Delta beamformers do not provide an output signal that is well-suited for high-quality imaging applications.

SUMMARY

Aspects of the application address the above matters, and others.

The embodiments herein relate to applying apodization to the received signals in an ultrasound imaging probe. As discussed in greater detail below, in the illustrated embodiment, the apodization is applied in connection with Sigma-Delta conversion of receive echoes, while in another embodiment, the apodization is applied to an output of the Sigma-Delta conversion, in the ultrasound imaging probe.

In one aspect, an ultrasound transducer probe includes a transducer array of elements that emit an ultrasound signal and receive analog echo signals produced in response thereto and a beamformer, housed by the probe, that converts the analog echo signals to digital signals, applies delays to the digital signals, and sums the delayed digital signals, produces a value of a bit stream, wherein the beamformer apodizes the signals.

In another aspect, a method includes beamforming, with a beamformer housed in an ultrasound probe, analog echo signals received by a plurality of transducer elements, producing a digital bit stream, wherein the beamforming includes digitizing the echo signals, applying delays to the digitized signals, and summing the delayed digital signals, and wherein the beamforming includes apodizing the signals.

In another aspect, an imaging system includes a transducer probe. The transducer probe includes a beamformer, housed by the probe, that converts analog echo signals to digital signals, applies delays to the digital signals, and sums the delayed digital signals, producing a bit stream, wherein the beamformer apodizes the signals. The signals are apodized at least one of during or after digital conversion and with a function that includes more than five different apodization levels.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

The following describes an approach(s) to applying apodization in an ultrasound imaging probe. In one instance, this includes applying apodization in connection with Sigma-Delta conversion of receive echoes. In another instance, this includes applying apodization to an output of the Sigma-Delta conversion, still in the ultrasound imaging probe.

Figure 1:
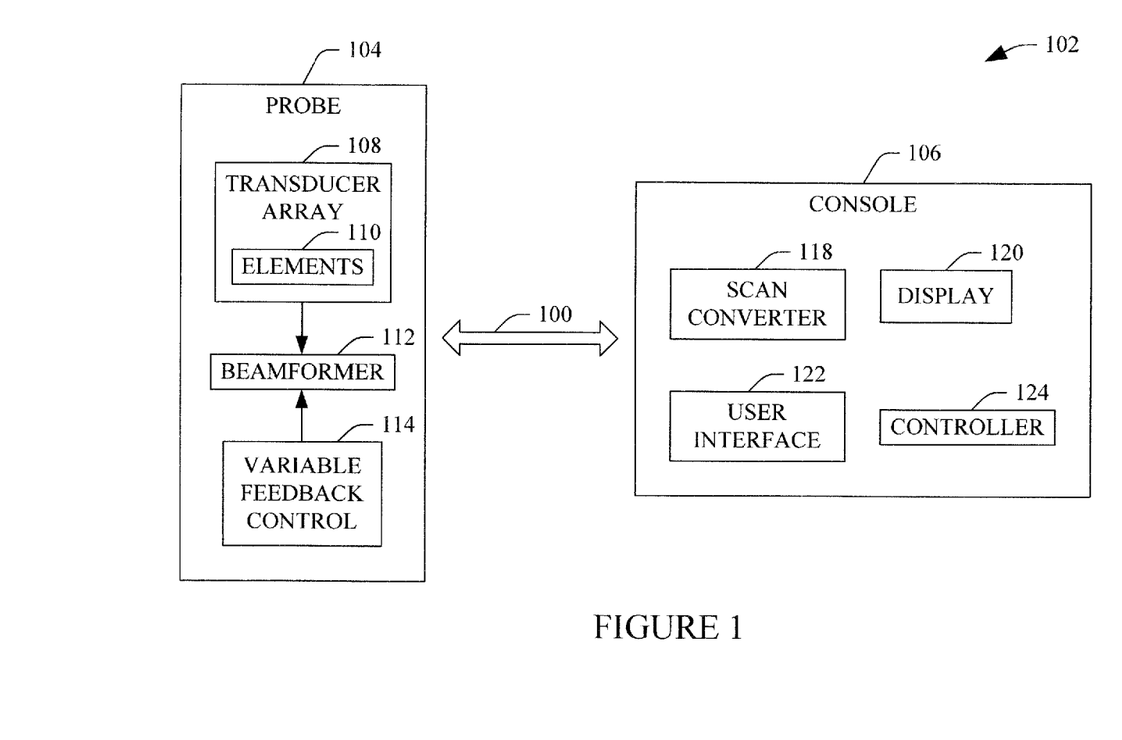
FIG. 1 schematically illustrates example of an ultrasound imaging system with a probe with beamforming and apodization.

Referring now to FIG. 1, an example imaging system such as an ultrasound imaging system 102 is illustrated. The illustrated imaging system 102 includes an ultrasound probe 104 and a console 106, which are in electrical communication via a communication path 100.

The probe 104 includes a housing (not visible) that houses a transducer array 108. The transducer array 108 includes a plurality of transducer elements 110 configured to transmit ultrasound signals into a scan field of view and receive echoes (analog echo signals), which are generated in response to the interaction between the emitted ultrasound signals and structure.

More generally, the transducer array 108 converts electrical signals to an ultrasound pressure field and vice versa. The transducer array 108 can be linear, curved, and/or otherwise shaped, fully populated, sparse and/or a combination thereof, one dimensional (1D) or two dimensional (2D), etc., producing 2D and/or three dimensional (3D) data.

The housing of the probe 104 also houses a beamformer 112. For receive, the beamformer 112 receives echoes and processes the received echoes, for example, by converting received analog signals to digital signals, applying fixed time delays and weights, summing the delayed-weighted signals, and/or otherwise processing the echoes, producing scan lines, which are output in a bit stream. In the illustrated example, both transmit and receive have a fixed focus or focal points.

For transmit, the logic can be in the probe 104 and/or in the console 106. Where in the probe 104, the transmit logic can be part of the beamformer 112 and/or separate logic.

The illustrated beamformer 112 also applies apodization. In the illustrated embodiment, the apodization is controlled by variable feedback control 114. As described in greater detail below, in one non-limiting instance, the apodization is integrated with analog-to-digital conversion of the received echoes.

Generally, the apodization is applied as a windowing function across the channels, using floating or fixed point values, with more than five (5) levels (e.g., 100 levels), providing individual dynamic apodization for each channel. In one non-limiting instance, the values are normalized from zero (0) to one (1). The windowing function can be a smooth function (e.g., with gradual and not abrupt steps), step-like, and/or otherwise. In other instance, the values are bounded by a different range. Examples of suitable apodization functions include, but are not limited to, the Hanning window, the Hamming window, and/or other apodization window.

The windowing produces scan lines that result in higher-quality images, relative to a configuration in which apodization is omitted or applied with five or less levels. Also described in greater detail below, the apodization can alternatively be applied on the digital signals. Note that the apodization for each channel can be different and can change for a channel with each echo received.

The console 106 receives the bit stream from the probe 104 via the communication path 100, which can include a hard wire path such as a coaxial cable and/or a wireless path.

The console 106 includes a scan converter 118 that scan converts the data, generating data suitable for display, for example, by converting the data to the coordinate system of a display monitor.

Presentation of the data via a display 120 can be in connection with a rendering engine and an interactive graphical user interface (GUI), which allows the user to selectively rotate, scale, and/or manipulate the displayed data.

A user interface (UI) 122 includes an input device(s) (e.g., a mouse, keyboard, touch controls, etc.), which allows for user interaction with the system 102.

A controller 124 controls the various components of the imaging system 102. For example, such control may include activating an A-mode, B-mode, C-plane, vector flow, and/or other data acquisition mode.

Figure 2:
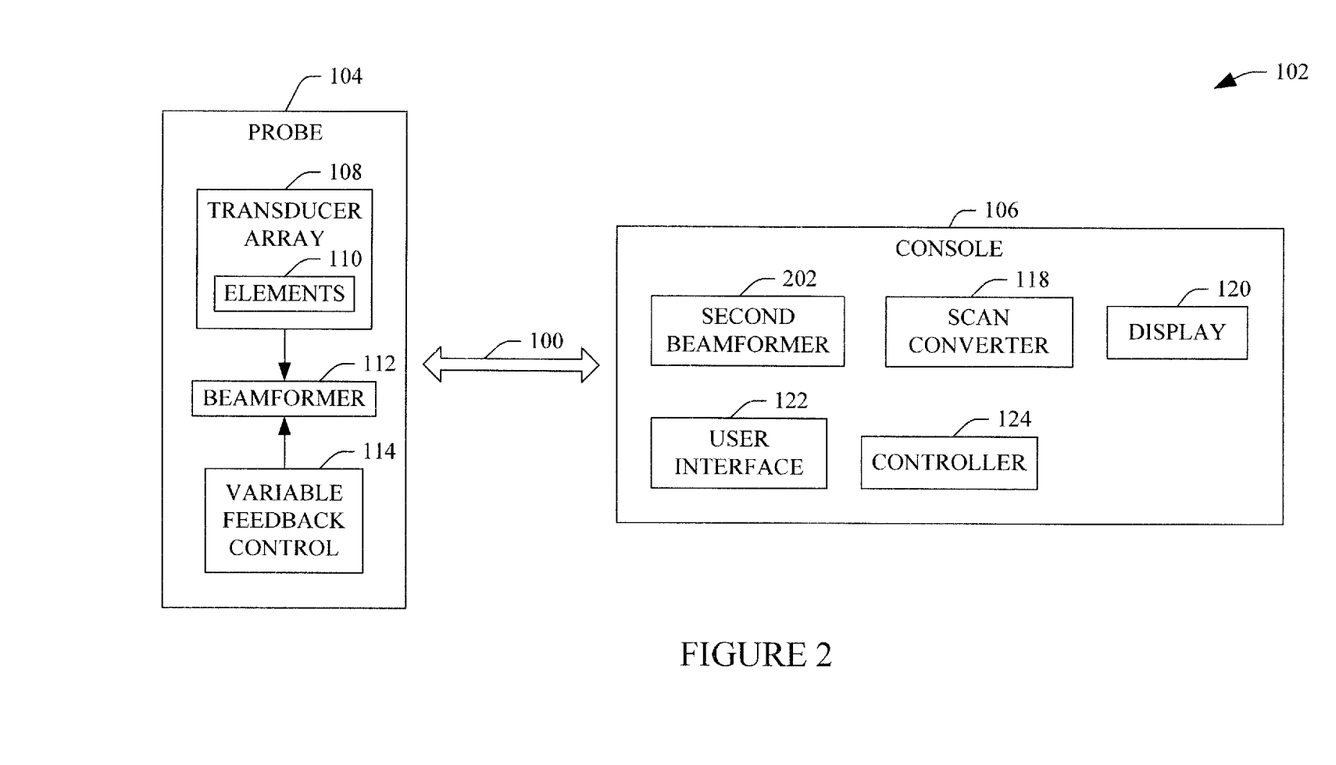
FIG. 2 schematically illustrate examples of an ultrasound imaging system with a probe with first stage beamforming and apodization and a console with subsequent stage beamforming.

In FIG. 2, the imaging system 102 employs synthetic aperture sequential beamforming (SASB). With this configuration, the beamformer 112 generates first stage scan lines with a fixed transmit and receive focus, and a second beamformer 202, of the console 106, beamforms the first stage scan lines and generates higher resolution scan lines with dynamic focus in both transmit and receive. SASB is discussed in detail in Kortbek et al., "Synthetic Aperture Sequential Beamforming," IEEE International Ultrasonics Symposium Proceedings, 969 (2008).

Figure 3:
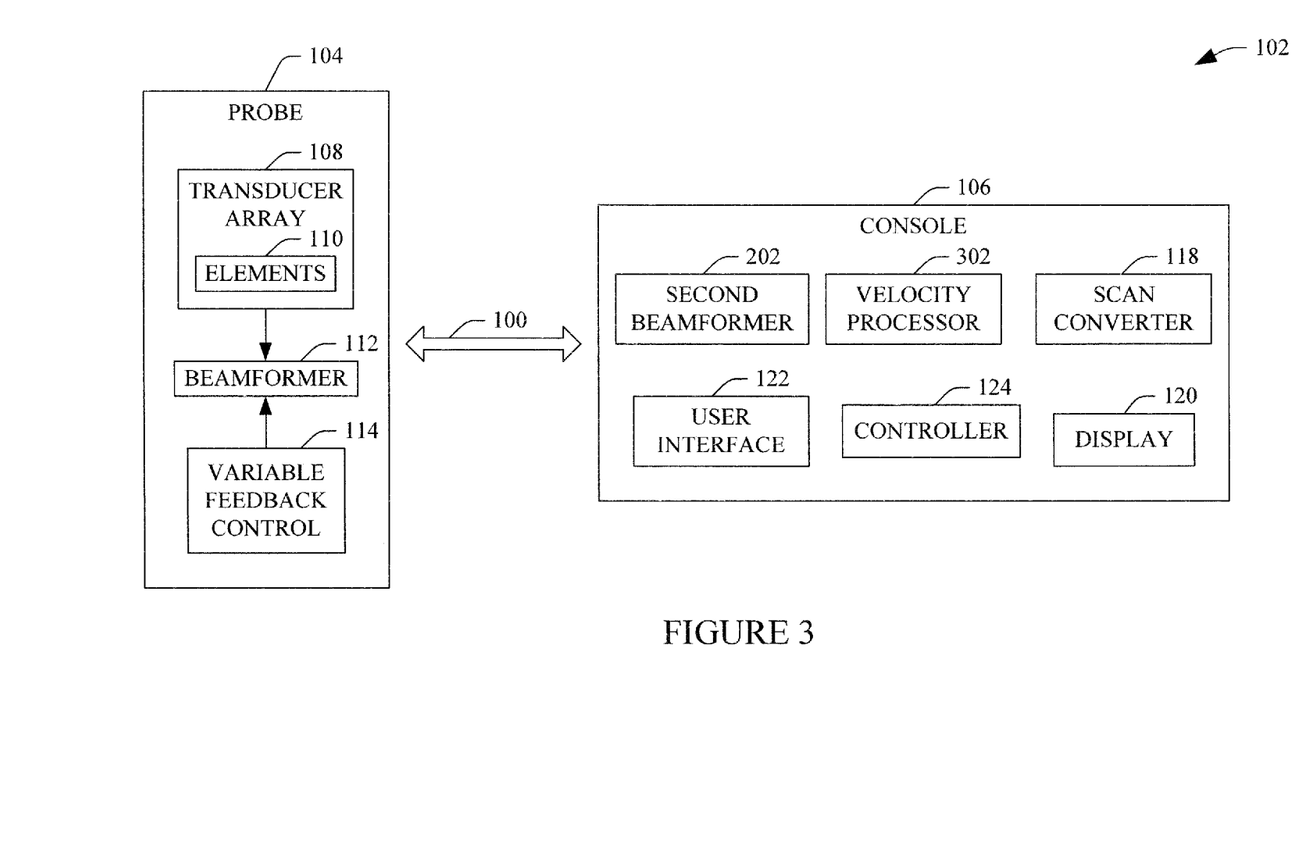
FIG. 3 schematically illustrate examples of an ultrasound imaging system with a probe with beamforming and apodization and a console that supports vector flow imaging.

In FIG. 3, the console 106 includes the second beamformer 202 and additionally includes a velocity processor 302, which processes the data output by the second beamformer 202, and determines one or more of a velocity in the axial, azimuth, and/or lateral directions. Velocity information can be displayed along with ultrasound images using indicia such as color, arrows, etc. The scan converter 118, the display 120, the user interface 122, and the controller 124 are as described herein.

Other configurations, including, but not limited to, a combination of FIGS. 1, 2 and/or 3 are also contemplated herein. For example, the configurations herein may also include time-gain compensation, which compensates for decreased signal level with increased depth, or depth dependent gain compensation for signal attenuation by structure in the scan field of view. Time-gain compensation is discussed in Norman, "A band-pass delta-sigma modulator for ultrasound imaging at 160 MHz clock rate," IEEE Journal of Solid-State Circuits 31, 2036-2041 (1996).

The system 102 may include one or more processors (e.g., a central processing unit (CPU), micro-processor, controller, etc.) of a computing system that execute one or more computer readable instructions encoded or embedded on computer readable storage medium such as physical memory and other non-transitory medium to implement a component thereof. Additionally or alternatively, an instruction can be carried in a signal, carrier wave and other transitory or non-computer readable storage medium.

Figures 4, 5:
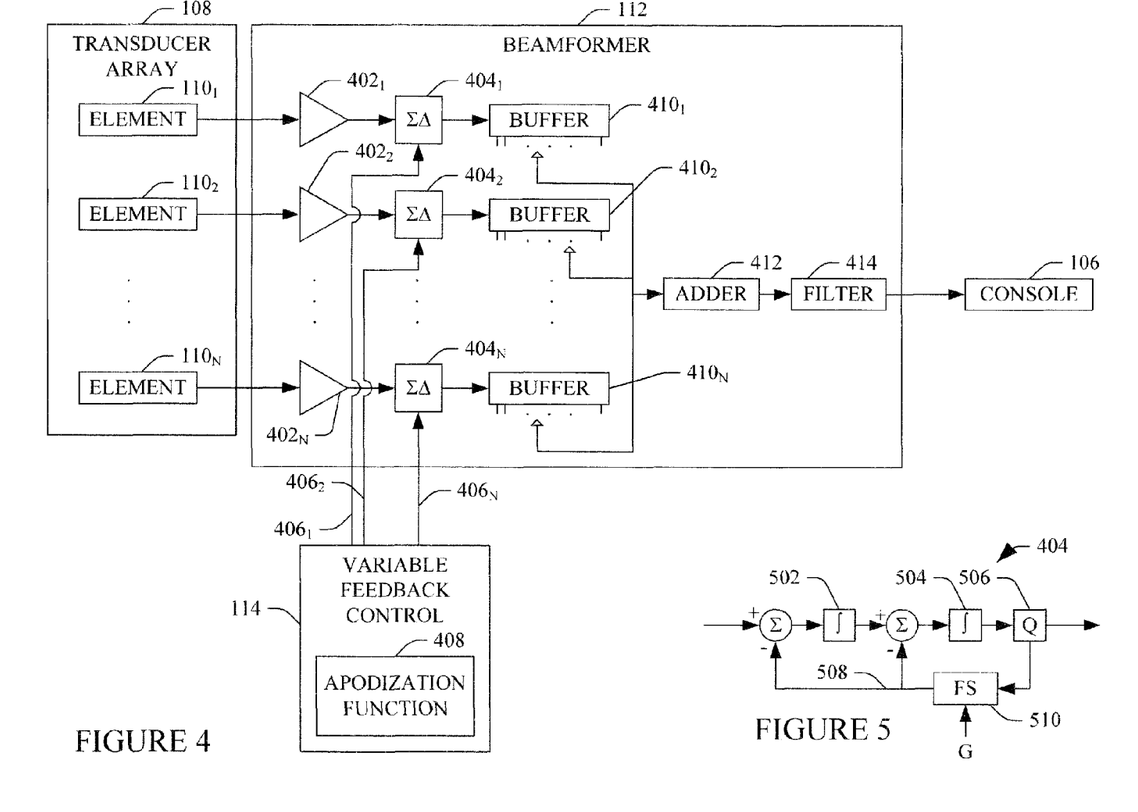
FIG. 4 schematically illustrate an example of the beamformer in which apodization is integrated in a Sigma-Delta modulator via predetermined gains or weights of a windowing function.
FIG. 5 schematically illustrate a non-limiting example of the Sigma-Delta modulator.

FIG. 4 illustrates an example of the beamformer 112. The transducer array 108 is shown with N elements, $110_1$, $110_2$, ..., $110_N$, where N is an integer. Each of the elements 110 generates an analog signal indicative of an echo received thereby.

The beamformer 112, in this example, includes a bank of amplifiers $402_1$, $402_2$, ..., $402_N$, which, respectively, amplify the signals from the elements $110_1$, $110_2$, ..., $110_N$. The beamformer 112 also includes a bank of Sigma-Delta (ΣΔ) modulators $404_1$, $404_2$, ..., $404_N$, which modulate corresponding amplified signals. The variable feedback control 106 provides individual gains $406_1$, $406_2$, ..., $406_N$, which are determined based on an apodization function 408, to the individual modulators $404_1$, $404_2$, $404_N$. Examples of apodization functions include, but are not limited to, pre-calculated values in a look-up table, values calculated on the fly, and values stored in a bit-stream that is decoded on the fly.

Briefly turning to FIG. 5, a non-limiting example of a suitable Sigma-Delta modulator 404 is illustrated. The Sigma-Delta modulator 404 is a second order modulator, including integrators 502 and 504, a two- or multi-level quantizer (Q) 506, and a feedback loop 508 with feedback scaler (FS) 510. The gain (G) 406 is provided to the FS 510, which controls the apodization by scaling the feedback and thus controls the sensitivity of the modulator 404. Summers 512 and 514 respectively add the scaled feedback with the inputs to the integrators 502 and 504. Other orders (e.g., $1^{st}$, $3^{rd}$, $4^{th}$, or higher order) and/or modulator configurations are also contemplated herein.

The following discusses example implementations of the FS 510. For a 2-level quantizer, the FS 510 can be implemented as a two input digital-to-analog converter (DAC) that uses the quantizer output as a reference voltage and the gain factor as digital input. The FS 510 can also be implemented as analog multiplier (e.g., if the gain factor is supplied as an analog value or if a digital the gain factor is first passed through a DAC).

For a multi-level quantizer, the FS 510 can be implemented as digital multiplier (e.g., quantized value*gain factor), followed by a DAC. In another instance, the FS 510 can be implemented as one DAC for the quantized signal and another DAC that uses the output of the first one as a reference voltage and the apodization/gain factor as a digital input. In another instance, the FS 510 can be implemented as one DAC for each of the quantized signal and the apodization factor followed by an analog multiplier.

Note that the possible output levels of a 2-level quantizer can be +Vq or −Vq (analog voltages), which can be used as reference voltages of a DAC. They are also interpreted in subsequent logic as logic level 1 and logic level 0. For a multi-level quantizer, the output is a multi-bit word that cannot directly be used in the feedback path, but necessitates a DAC.

The apodization/gain levels represent the desired amplification to the ultrasound echo signals. The actual gain factor that is supplied to the feedback scaler is inversely proportional to the desired gain level. The smaller the gain factor (and feedback magnitude), the more sensitive is the Sigma-Delta ADC, thus providing higher gain.

Returning to FIG. 4, the outputs of the Sigma-Delta (ΣΔ) modulators $404_1$, $404_2$, ..., $404_N$ are stored in respective buffers $410_1$, $410_2$, ..., $410_N$, which are used to add predetermined fixed delays. Suitable buffers include, but are not limited to first-in first-out (FIFO) buffers. The delayed values are summed via an adder 412 (or a tree of adders, or the like), with the resulting data placed in the bit stream, which is filtered (e.g., filtered and decimated) with a filter 414 and/or otherwise processed. The filtering can alternately be applied before the summing, individually on each signal. The processed bit stream is conveyed to the console 106 and processed thereby as discussed herein.

Figure 6:
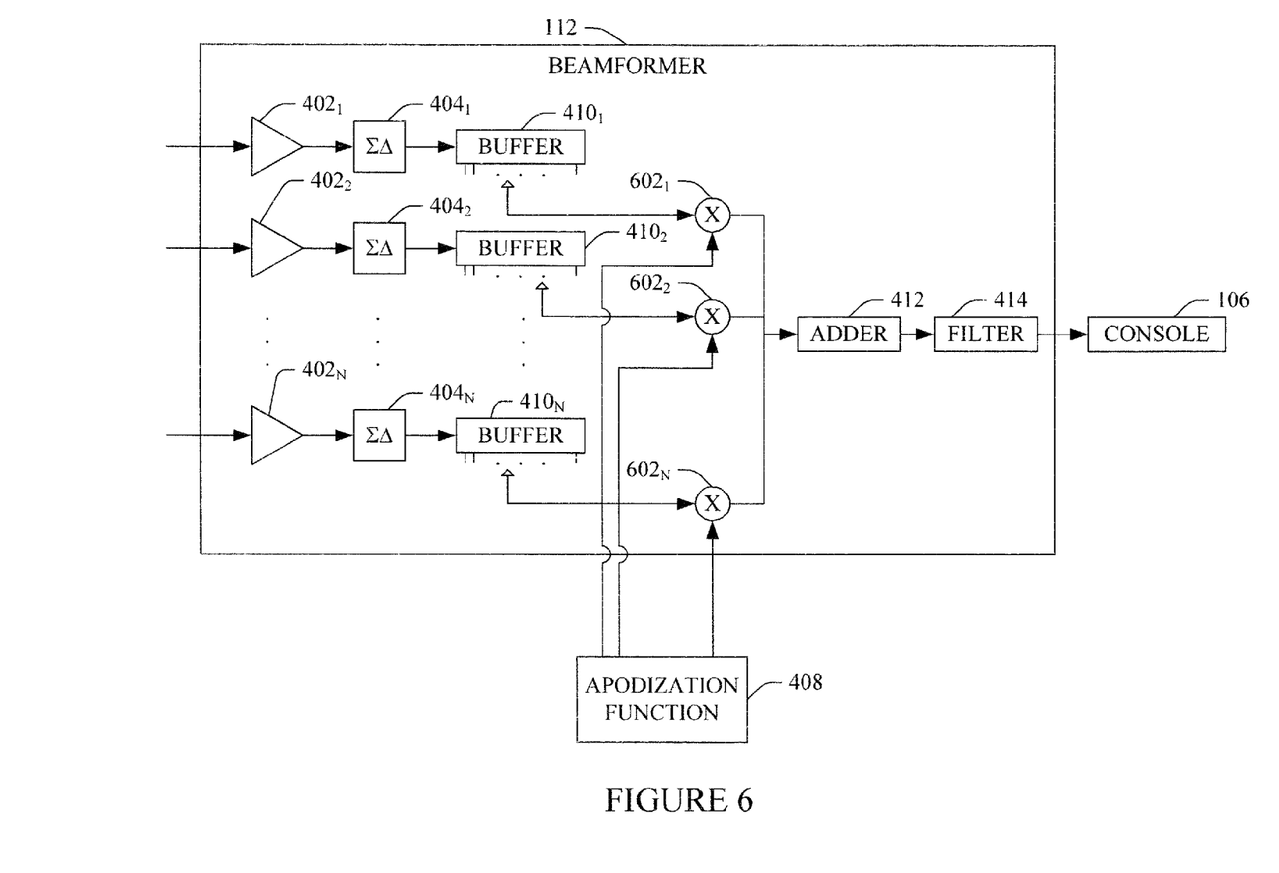
FIG. 6 schematically illustrate an example of the beamformer in which apodization applied after digitization by a Sigma-Delta converter using multipliers and predetermined coefficients.

FIG. 6 illustrates another example of the beamformer 112. In this example, the apodization is instead applied to the digital signals. Respective multipliers $602_1$, $602_2$, ..., $602_N$ multiply the delayed bits from the buffers $410_1$, $410_2$, ..., $410_N$ with the apodization function 408. The resulting signals are summed via the adder 412, filtered via the filter 414, and conveyed in the bit stream to the console 106, where they are processed as discussed herein.

With this embodiment, the apodization can be positive and/or negative. Alternatively, the filtering can be applied before the summing, individually on each signal.

Figure 7:
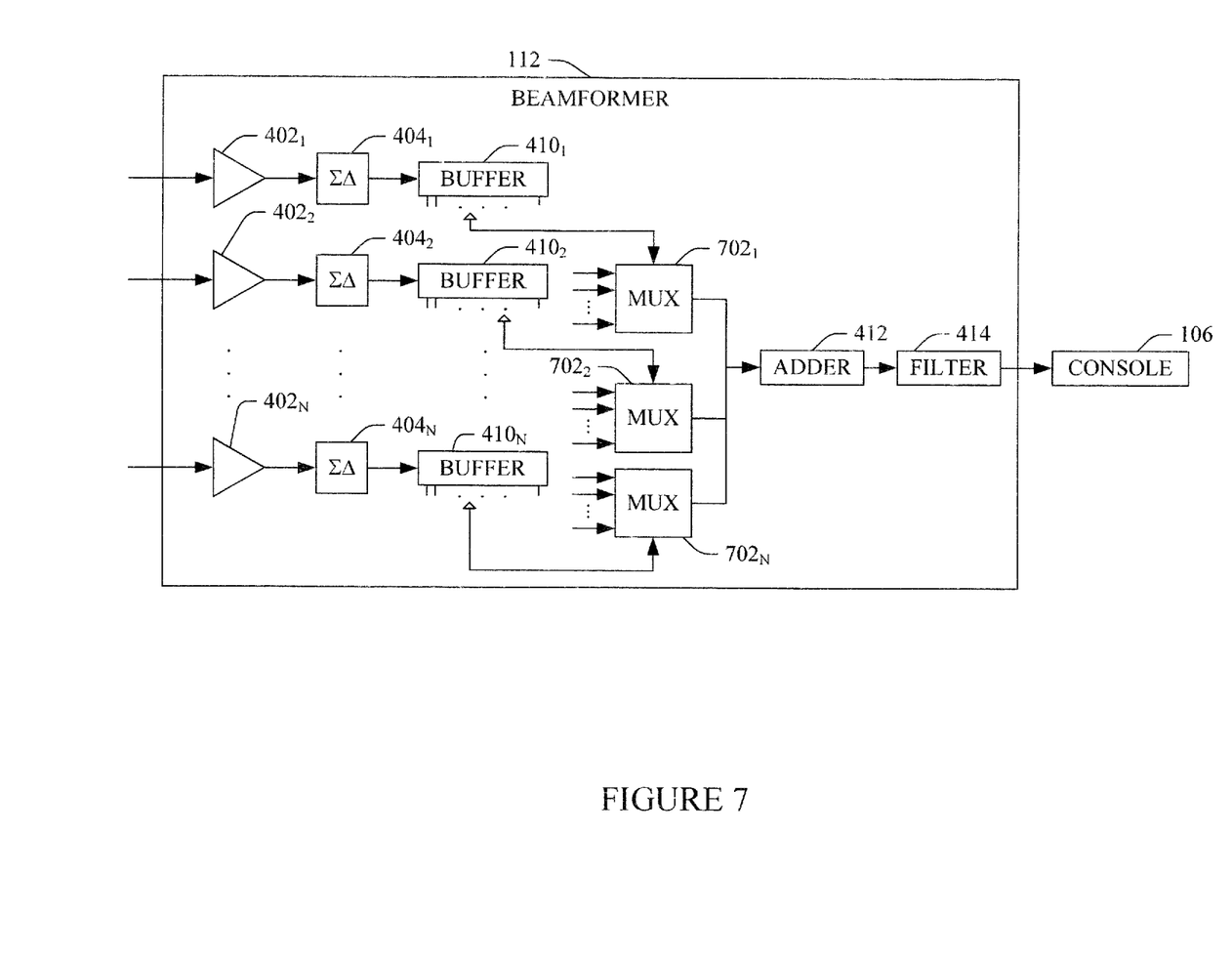
FIG. 7 schematically illustrate an example of the beamformer in which apodization applied after digitization by a Sigma-Delta converter using multiplexers and predetermined apodization.

FIG. 7 illustrates another example of the beamformer 112 with apodization applied instead to the digital signals. In this example, the digital signals from the buffers $410_1$, $410_2$, ..., $410_N$ are used as control signals to respective multiplexers (MUX) $702_1$, $702_2$, ..., $702_N$ and control which value input to the multiplexers (MUX) $702_1$, $702_2$, ..., $702_N$ is output by the multiplexers (MUX) $702_1$, $702_2$, ..., $702_N$. The output signals are summed via the adder 412, filtered via the filter 414, and conveyed in the bit stream to the console 106, where they are processed as discussed herein. With this embodiment, the apodization can be positive and/or negative.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

Where the probe 104 is wireless, the control provided by the user interface 122 of the console 106 can be integrated into the probe 104 and the console 106 can be omitted. Such control can be implemented via buttons or otherwise on the probe 104 and/or a "remote control." Images can be displayed with a passive device such as a television screen connected to the network. By way of non-limiting example, the examination room typically contains one or more display devices. In this example, an examiner carries one or more wireless transducer(s) in his pocket.

When the examination begins, the examiner presses a button on the probe 104 that 1) powers on the transducer array 108; 2) connects to a processing center (e.g., computers in the basement of the clinic/hospital); and 3) connects the processing center to a passive display device in the examination room. The first-stage data (output of the beamformer 112 is sent to the processing center, which carries out the processing conventionally done by the console 106, and the processing center then sends the image to the display device in the examination room.

In an alternative embodiment, the probe 104 is connected to a socket in the wall via a cable (for example a network cable).

Figure 8:
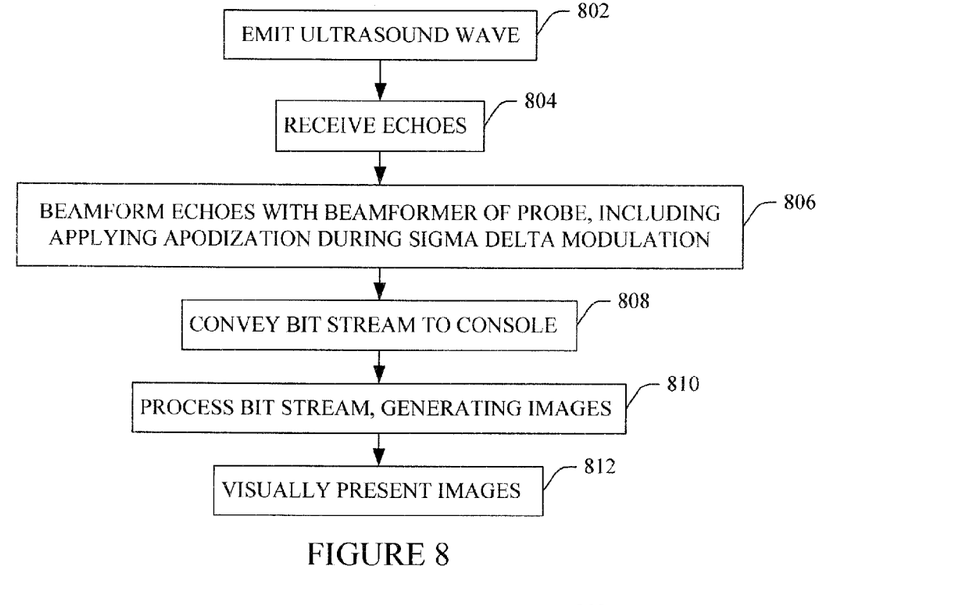
FIG. 8 schematically illustrates an example method in which apodization is applied in connection with a Sigma-Delta modulator in an ultrasound probe of an imaging system.

FIG. 8 illustrates a method in which apodization is applied with Sigma-Delta modulation in an ultrasound probe.

Note that the ordering of the acts is for explanatory purposes and is not limiting. As such, one or more of the acts can be performed in a different order, including, but not limited to, concurrently. Furthermore, one or more of the acts may be omitted and/or one or more other acts may be added.

At 802, an ultrasound wave is emitted into a scan field of view by a transducer array located in a transducer probe.

At 804, echoes generated in response thereto are received by the transducer array.

At 806, the echoes are beamformed with a beamformer of the probe, including applying apodization in connection with Sigma-Delta modulation, generating a hit stream.

At 808, the bit stream is conveyed to a console remote from the probe via a cable and/or a wireless communication channel.

At 810, the bit stream is processed, generating images of the scan field of view.

At 812, the images are visually presented.

Figure 9:
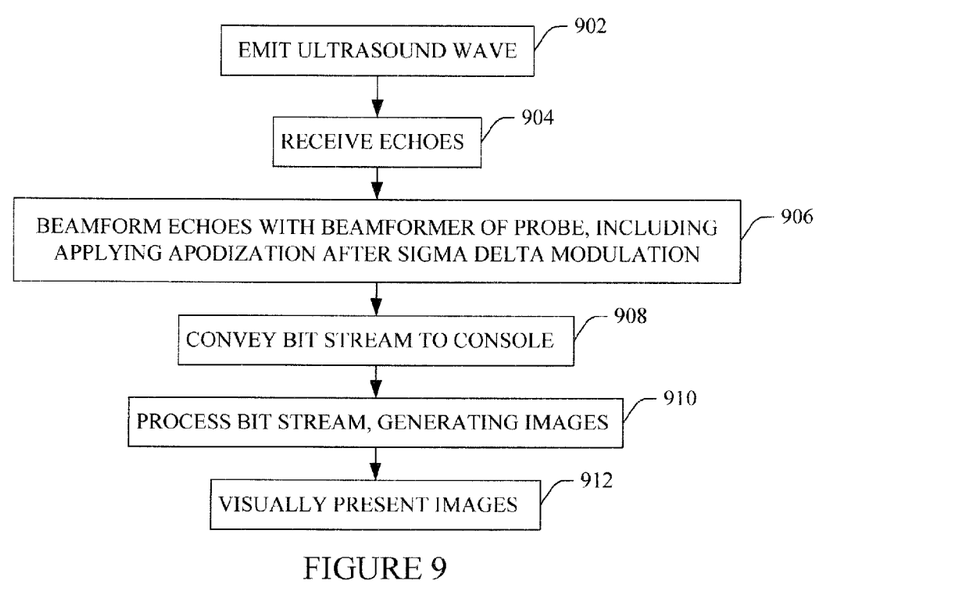
FIG. 9 schematically illustrates an example method in which apodization is applied (after digital conversion with a Sigma-Delta modulator) in an ultrasound probe of an imaging system.

FIG. 9 illustrates a method in which apodization is applied after Sigma-Delta modulation in an ultrasound probe.

Note that the ordering of the acts is for explanatory purposes and is not limiting. As such, one or more of the acts can be performed in a different order, including, but not limited to, concurrently. Furthermore, one or more of the acts may be omitted and/or one or more other acts may be added.

At 902, an ultrasound wave is emitted into a scan field of view by a transducer array located in a transducer probe.

At 904, echoes generated in response thereto are received by the transducer array.

At 906, the echoes are beamformed with a beamformer of the probe, including applying apodization after Sigma-Delta modulation, generating a bit stream.

At 908, the bit stream is conveyed to a console remote from the probe via a cable and/or a wireless communication channel.

At 910, the bit stream is processed, generating images of the scan field of view.

At 912, the images are visually presented.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound transducer probe, comprising:
    a transducer array of elements that emit an ultrasound signal and receive echo signals produced in response thereto, wherein each of the transducer elements generates an analog signal indicative of an echo signal received thereby;
    a beamformer, housed by the probe, wherein the beamformer comprises:
        a Sigma-Delta modulator, for each of the transducer elements, configured to convert an analog signal to a digital signal and apodize the digital signal;
        a buffer, for each of the Sigma-Delta modulator, configured to add a predetermined fixed delay to the apodized digital signal; and
        an adder configured to sum the delayed apodize digital signals, and produce a value of a bit stream; and
    variable feedback control configured to provide individual gains to the individual Sigma-Delta modulators, wherein the Sigma-Delta modulators apodize the individual digital signals and the individual gains control the apodization by scaling feedback of a feedback loop of the Sigma-Delta modulators to control sensitivities of the Sigma-Delta modulators.

2. The probe of claim 1, the beamformer,
    wherein the variable feedback control determines the individual gains based on an apodization function.

3. The probe of claim 1, wherein a Sigma-Delta modulator comprises:
    a first summer configured to add the scaled feedback with the digital signal,
    first integrator configured to integrate an output of the first summer;
    a second summer configured to add the scaled feedback with the output of the first integrator;
    a second integrator configured to integrate the scaled feedback with an output of the second summer;
    a two- or multi-level quantizer configured to quantize an output of the second integrator; and
    a feedback scaler configured to scale a gain of the feedback loop to scale the feedback.

4. The probe of claim 3, wherein the feedback scaler user the output of the two- or multi-level quantizer as a reference voltage and a gain factor as a digital input.

5. The probe of claim 2, wherein the apodization function includes more than five different levels of apodization.

6. The probe of claim 5, wherein each level is represented as a floating or fixed point value.

7. The probe of claim 3, wherein respective values of the apodization function scale corresponding values of the feedback loops.

8. The probe of claim 1, wherein the beamformer is a first stage beamformer of a multi-stage synthetic aperture sequential beamformer, wherein a subsequent beamformer stage is remote from the probe.

9. The probe of claim 1, wherein the probe conveys the bit stream to a remote device via a hard wire communication path.

10. The probe of claim 1, wherein the probe conveys the bit stream to a remote device via a wireless communication path.

11. The probe of claim 1, wherein the bit stream represents three dimensional data.

12. A method, comprising:
    beamforming, with a beamformer housed in an ultrasound probe, analog echo signals received by a plurality of transducer elements, producing a digital bit stream, wherein the beamforming includes:
        utilizing a Sigma-Delta modulator, for each element, to convert a corresponding analog echo signal to a digital signal;
        employing variable feedback control with the Sigma-Delta modulator that provides apodization functions to apodize the digital signals, and
        apodizing with the Sigma-Delta modulator the digital signals with the apodization functions;
    applying delays to the apodized digitized signals; and
    summing the delayed apodized digital signals.

13. The method of claim 12 wherein the apodization function include more than five different levels that are represented as a floating or fixed point values.

14. The method of claim 13, wherein the apodization function independently scales corresponding values of feedback loops of the Sigma-Delta modulators.

15. The method of claim 12, wherein the beamforming is a first stage of a multi-stage synthetic aperture sequential beamforming, wherein a subsequent beamforming stage is remote from the probe.

16. A non-transitory computer readable medium configured computer executable instructions which when executed by a processor causes the processor to:
    receive analog signals indicative of echo signals received by a plurality of transducer elements;
    convert, for each element and with a Sigma-Delta modulator, an analog signal to a digital signal;
    receive, from a variable feedback control and by Sigma-Delta modulator, an apodization function;

apodize, with the Sigma-Delta modulator, the digital signal using the apodization function;

apply delays to the apodized digitized signals; and sum the delayed apodized digital signals.

17. The non-transitory computer readable medium of claim 16, wherein the apodization function include more than five different levels that are represented as a floating or fixed point values.

18. The non-transitory computer readable medium of claim 16, wherein the apodization function independently scales corresponding values of feedback loops of the Sigma-Delta modulators.

19. The non-transitory computer readable medium of claim 16, wherein the steps of apodizing, applying delays, and summing are performed in an ultrasound probe.

20. The non-transitory computer readable medium of claim 17, wherein subsequent steps are performed outside of the ultrasound probe.

* * * * *